United States Patent [19]

Fukaya et al.

[11] Patent Number: 5,258,752
[45] Date of Patent: Nov. 2, 1993

[54] BROAD BAND DIGITAL EXCHANGE

[75] Inventors: Naoki Fukaya; Yutaka Kakuno, both of Yokohama, Japan

[73] Assignee: Sumitomo Electric Industries, Ltd., Osaka, Japan

[21] Appl. No.: 686,837

[22] Filed: Apr. 17, 1991

Related U.S. Application Data

[63] Continuation of Ser. No. 436,702, Nov. 15, 1989, abandoned.

[30] Foreign Application Priority Data

Nov. 25, 1988 [JP] Japan .................................. 63-297482
Nov. 25, 1988 [JP] Japan .................................. 63-297483
Dec. 23, 1988 [JP] Japan .................................. 63-325484

[51] Int. Cl.$^5$ .............................................. H04Q 1/00
[52] U.S. Cl. ........................... 340/825.8; 340/825.89; 340/827; 307/112; 370/60; 370/94.2
[58] Field of Search ............... 340/825.8, 825.89, 826, 340/827; 307/112; 455/60; 370/60, 94.1, 94.2, 58.1

[56] References Cited

U.S. PATENT DOCUMENTS

| | | | |
|---|---|---|---|
| 4,679,190 | 7/1987 | Dias et al. | |
| 4,709,364 | 11/1987 | Hasegawa et al. | 370/94.1 X |
| 4,813,038 | 3/1989 | Lee | 370/60 |
| 4,833,468 | 5/1989 | Larson et al. | 340/825.8 |
| 4,899,334 | 2/1990 | Shimizu | 370/60 |
| 4,922,485 | 5/1990 | Quinquis et al. | 370/60 |

OTHER PUBLICATIONS

Lee, et al "The Architecture of a Multicast Broadband Packet Switch," Proceedings of the IEEE Infocom 1988, pp. 1-8, New Orleans, La., Mar. 27-31, 1988.
Eng, et al "A Knockout Switch for Variable-Length Packets," IEEE Journal on Selected Areas in Communications, vol. SAC-5, No. 9, pp. 1426-1435, Dec. 1987.

*Primary Examiner*—Donald J. Yusko
*Assistant Examiner*—Brian Zimmerman
*Attorney, Agent, or Firm*—Stevens, Davis, Miller & Mosher

[57] ABSTRACT

A broad band digital exchange is provided which includes a Banyan network or Batcher Banyan network which is used in an ATM machine for selectively connecting digital information. In such networks, cells which retain information may conflict so that the cell is discarded. Thus, all input information is not always transmitted. In order to lower the cell discard rate, various techniques have been proposed. In the present invention, an identification bit is provided in a header of the cell. When cells conflict, the identification bit of the losing cell is set so that the losing cell does not impede the transmission of information contained in the other cell. In another aspect, when cells conflict, a conflict detection signal is sent back to a buffer controller which controls the send-out of the information cells. In another aspect, the conflict detection signal is sent back to the buffer controller through a path through which the losing cell has been supplied. When the buffer controller receives such conflict detection signal, it resends the information of the losing cell stored in the buffer memory. As a result, the discard rate of the cells is lowered and the required hardware of the network is reduced.

3 Claims, 10 Drawing Sheets

BROAD BAND DIGITAL EXCHANGE

This application is a continuation of application Ser. No. 436,702, filed Nov. 15, 1989 now abandoned.

BACKGROUND OF THE INVENTION

1. Field of the Invention

The present invention relates to a broad band digital exchange applicable to a broad band ISDN (integrated services digital network), and more particularly to a broad band digital exchange with uses in ATM (asynchronous transfer mode).

2. Related Background Art

A prior art ATM exchange uses a Banyan network in which 2×2 unit switches are regularly arranged. The Banyan network is used as a switching element network for exchanging digital information. The connection state of each unit switch is switched in accordance with a destination address stored in each cell. Thus, the cells inputted to input channels of the Banyan network are outputted to predetermined output channels. If there is a conflict between the cells inputted to two input terminals of the unit switches because of the same destination addresses, one of the cells is preferentially outputted to the predetermined output terminal of the unit switch in accordance with the stored address. However, the other cell is outputted to an output terminal which is different from the intended output terminal specified by the destination address. As a result, the other cell reaches the output terminal which is different from the destination address.

Thus, in the switching element network of the prior art ATM exchange, the cell whose transmission path is not preferentially selected when the cells conflict is not outputted to the predetermined output terminal determined by the destination address stored in the cell. Hereinafter, the cell which is preferentially selected is called a won cell, and the cell which is not preferentially selected is called a lost cell. Once the cell loses, it becomes a totally invalid cell in the Banyan network. In each unit switch, the connection state of the switch is determined based on only one bit of the destination address. As a result, there is a possibility that a lost cell conflicts with a valid cell which has heretofore continuously won and wins to the valid cell in the unit switch of the next stage. As a result, the invalid cell in the Banyan network impedes the transmission path of the valid cell and it raises a cell discard rate in the ATM exchange.

In addition to the Banyan network, a Batcher Banyan network is also used as the switching element network in the ATM exchange. The Batcher Banyan network is provided with a sorting network in a preceding stage to the Banyan network.

In the Banyan network, the discard rate of the cell is raised when the cells conflict in the network, as described above, on the other hand, in the Batcher Banyan network, a probability of conflict of the cells is low but it requires $2^N \times N \times (N+1)/2$ 2×2 unit switches in the Batcher switching network, where N is the number of input channels. As a result, the hardware requirements of the network increase and the system is of large size.

SUMMARY OF THE INVENTION

It is an object of the present invention to provide a broad band digital exchange which can reduce the amount of hardware in the network, lower the discard rate of the cell and permit proper information transmission.

In order to achieve the above object, in the present invention, an identification bit to indicate whether effective information is stored in the cell or not is provided in a header of the cell. Further, based on a destination address and the identification bit stored in the header of the cell, each of the 2×2 unit switches determines the connection state of the switch itself. Accordingly, if the cells which have effective information conflict with each other, the cell having a higher priority is supplied to a predetermined output terminal in accordance with the stored destination address. The cell having a lower priority has the identification bit in the header modified to non-effective information so that it is supplied to the other side than the predetermined output terminal.

As a result, even if the cell which has lost in the conflict among the cells is transmitted to the output channel which is different from the destination address stored in the cell, the lost cell is recognized as one having no effective information. A probability of loss of the cell having effective information is thus lower and there will be no case where wrong information is transmitted to the output channel.

The present invention comprises a buffer memory arranged in a preceding stage to each input channel, a detection signal output unit provided for every plural stages of switching elements, and a buffer control unit for controlling sending of information stored in the buffer memory based on a conflict detection signal supplied by the detection signal output unit.

When there is a conflict of information in the switching elements, the switching elements supply the conflict detection signal to the buffer control unit. In response to the conflict detection signal, the buffer control unit retransmits the information relating to the discard which has been stored in the buffer memory.

The present invention also comprises a buffer memory arranged in a preceding stage to each input channel, a detection signal output unit provided for every plurality of first switching elements for switching connections between the input channel and the output channel, a buffer control unit for controlling sending of information stored in the buffer memory based on a conflict detection signal supplied from the detection signal output unit, and second switching elements provided in duplex to correspond to the first switching elements, for forming a path of the conflict detection signal.

Thus, when a conflict of information occurs in the switching elements, the conflict detection signal is sent to the buffer control unit through the same duplex path as that through which the cell which had lost in the conflict reached. As a result, the buffer control unit can detect the information in the input channel which is to be discarded and retransmit the information relating to the discard which has been stored in the buffer memory.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
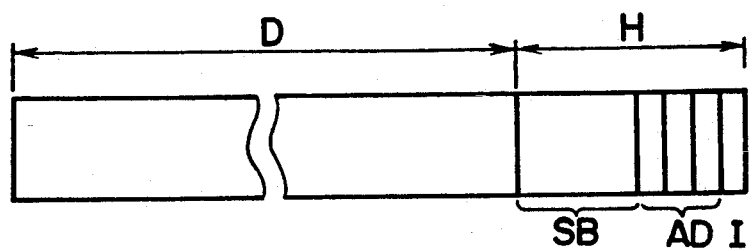
FIG. 1 shows a format of a cell (information) used in embodiments of the present invention.

FIG. 1 shows a format of a cell used in the embodiments of the present invention. This cell is used as a unit packet of information transmission.

The cell comprises a fixed length header H and a fixed length information field D. The header H has two bytes which comprise a one-bit vacancy identification bit I, a 3-bit address AD which represents an address to which the cell is to be transmitted, and a spare area SB in which control data such as an error detection code is written. Those bits are arranged in the order described above, preceded by the vacancy identification bit I in accordance with the time sequence of the transmission. The information field D has 98 bytes in which digital information, expressed in binary notation, to be transmitted is stored. When effective information is retained in the information field D, the vacancy identification bit I of the header H is set to "1". When effective information is not retained in the information field D, the vacancy identification bit I is set to "0".

The number of bytes and bits described above are examples in the first embodiment of the present invention and they may change in accordance with an applicable system.

Figure 2:
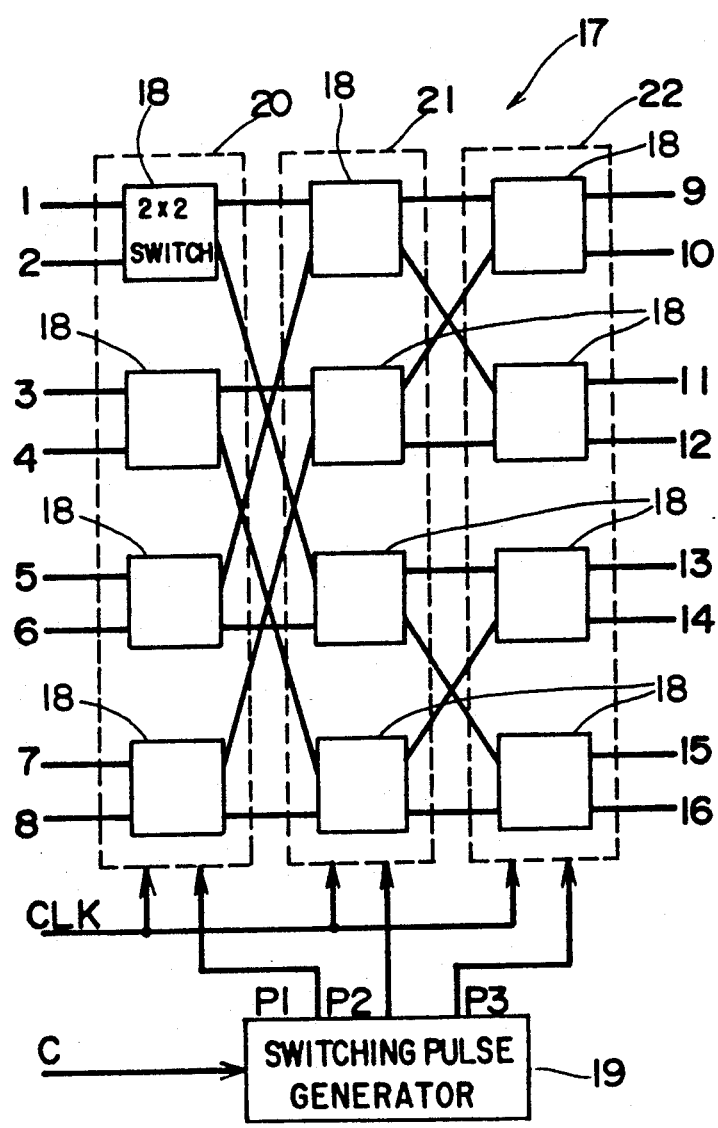
FIG. 2 shows a block diagram of an 8×8 exchange switch which is used in a first embodiment of the present invention in which a 2×2 unit switch is used as a unit of construction.

FIG. 2 shows a block diagram of an 8×8 exchange switch in the first embodiment of the present invention. The 8×8 exchange switch constitutes a switching network of the digital exchange.

The 8×8 exchange switch 17 has $8(=2^3)$ input channels 1 to 8 and eight output channels 9 to 16, and it forms a 3 columns by four rows Banyan network by using a 2×2 unit switch 18 as a unit. The Banyan network uses a total of twelve 2×2 unit switches 18. A switching pulse generator 19 receives a cell synchronization signal C and supplies switching pulses p1 to p3 at different timings to blocks 20 to 22, which are formed for the respective columns of the 2×2 unit switches 18. The switching pulses p1 to p3 are outputted in synchronism with the timing at which the leading edge of the cell passes through the 2×2 unit switch 18. Thus, the transmission paths of the cell data supplied to the input channels 1 to 8 are switched for each of the blocks 20 to 22 in synchronism with the timing at which the switching pulses p1 to p3 are supplied. As a result, the cell information supplied to the input channels 1 to 8 are supplied to the predetermined output channels 9 to 16.

Figure 3:
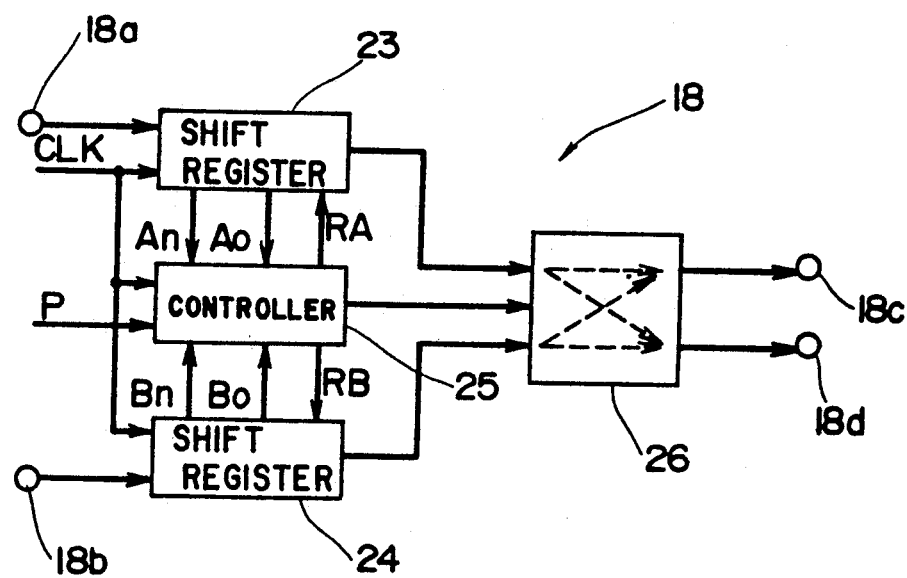
FIG. 3 shows a block diagram of the 2×2 unit switch shown in FIG. 2.

FIG. 3 shows a block diagram of the 2×2 unit switch 18, which constitutes a unit of the 8×8 exchange switch 17.

Input terminals 18a and 18b are connected to shift registers 23 and 24, respectively, to which a clock pulse CLK is applied. The cells A and B supplied to the input terminals 18a and 18b are synchronized with the clock pulse CLK and read into the shift register 23 and 24 bit by bit.

A controller 25 determines a connection state of each of the 2×2 unit switches 18 based on the vacancy identification bit I and the destination address AD stored in the cell. The controller 25 reads in input bit signals $A_o$, $A_n$ and $B_o$, $B_n$ from shift registers 23 and 24 at the timing at which the switching pulse P is applied. Those signals are outputted from predetermined ones of flip-flops which constitute the shift registers 23 and 24. As a result, the controller 25 reads in the vacancy identification bits I which are top bits of the cells A and B and the n-th bit of the destination address AD. The controller 25 controls the connection state of the switching element 26 based on the bits $A_o$, $B_o$ and the bits $A_n$, $B_n$. The suffix n means that the 2×2 unit switch 18 is located in the n-th column (n=1 to 3) of the 8×8 exchange switch 17.

Figure 4:
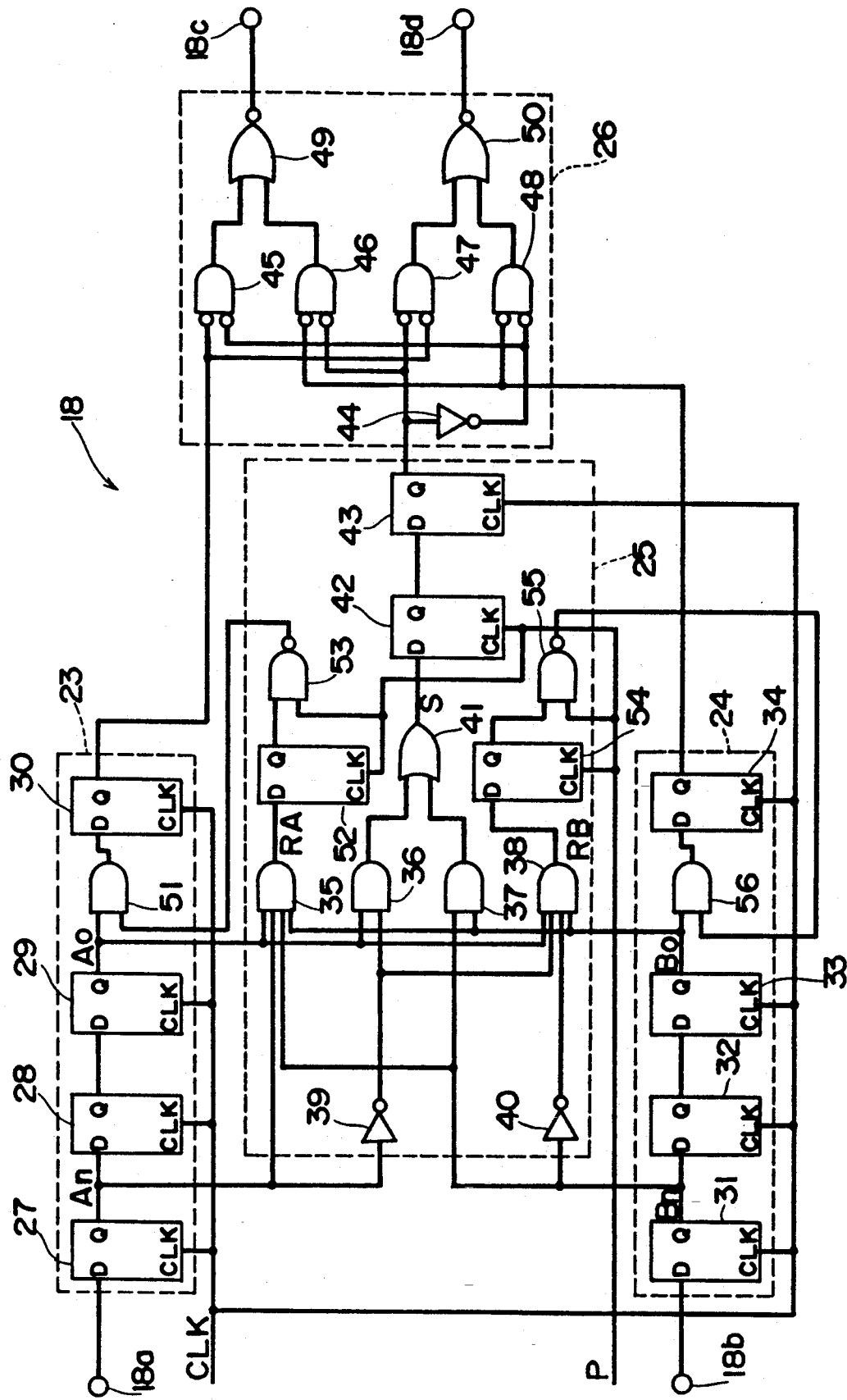
FIG. 4 shows a circuit diagram of the 2×2 unit switch shown in FIG. 2, FIGS. 5(a) and 5(b) show timing charts of a clock signal CLK and a switching pulse P used in the embodiments of the present invention.

FIG. 4 shows a detailed circuit diagram of the 2×2 unit switch 18 shown in FIG. 3.

The shift registers 23 and 24 comprise four D-type flip-flops 27 to 30 and 31 to 34 and AND circuits 51 and 56, respectively. The bits $A_o$ and $B_o$ which correspond to the top bits of the input cells A and B are supplied to the controller 25 from the inputs of the AND circuits 51 and 56 connected to the data input terminals D of the D-type flip-flops 30 and 34 of the final stages which are located at the rightmost in FIG. 4. The bits $A_n$ and $B_n$ are supplied to the controller 25 from the n-th stage data input terminals D counted leftward from the final stage D-type flip-flops.

For example, when the 2×2 unit switch 18 is located in the first stage block 20, the data from the data input terminals D of the D-type flip-flops 29 and 33 are supplied to the controller 25. When the 2×2 unit switch 18 is located in the second stage block 21, the data from the data input terminals D of the D-type flip-flops 28 and 32 (as shown in FIG. 4) are supplied to the controller 25. When it is located in the third stage block 22, the data from the data input terminals D of the D-type flip-flops 27 and 31 are supplied to the controller 25. The D-type flip-flops 27 to 34 supplies the signals applied to the data input terminals D to the data output terminals Q in synchronism with the clock pulse CLK.

The controller 25 comprises NOT circuits 39 and 40, AND circuits 35 to 38, NAND circuits 53 and 55, an OR circuit 41 and D-type flip-flops 42, 43, 52 and 54. Those logic circuits are connected in accordance with a logical expression shown in Table 1. The bits $A_o$, $B_o$, $A_n$ and $B_n$ supplied to the controller 25 are logically operated by the NOT circuit 39, the AND circuits 36 and 37 and the OR circuit 41 so that a control signal S to control the connection state of the switching element 26 is generated. Reset signals RA and RB are generated through logical operation by the NOT circuits 39 and 40 and the AND circuits 35 and 38 to reset the vacancy identification bit I of the cell which has lost in the conflict of the cells. In table 1, "·" represents an AND function, "+" represents an OR function, and "−" represents an inverted signal.

TABLE 1

| Signal | Logical Expression |
|---|---|
| S | $A_o \cdot \overline{A_n} + B_o \cdot B_n$ |
| RA | $A_o \cdot B_o \cdot A_n \cdot \overline{B_n}$ |
| RB | $A_o \cdot B_o \cdot \overline{A_n} \cdot B_n$ |

Further, the control signal S is produced by the D-type flip-flops 42 and 43 in synchronism with the timing at which the switching pulse P is applied to the clock terminals CLK of the D-type flip-flop 42. The switching pulse P rises at the timing at which the bits $A_o$ and $B_o$ corresponding to the top bits of the cells, that is, the vacancy identification bits I reach the data input terminals D of the D-type flip-flops 30 and 34. The bits $A_n$ and $B_n$ at this timing correspond to the n-th bits from the tops of the destination addresses AD of the cells.

Figure 5:
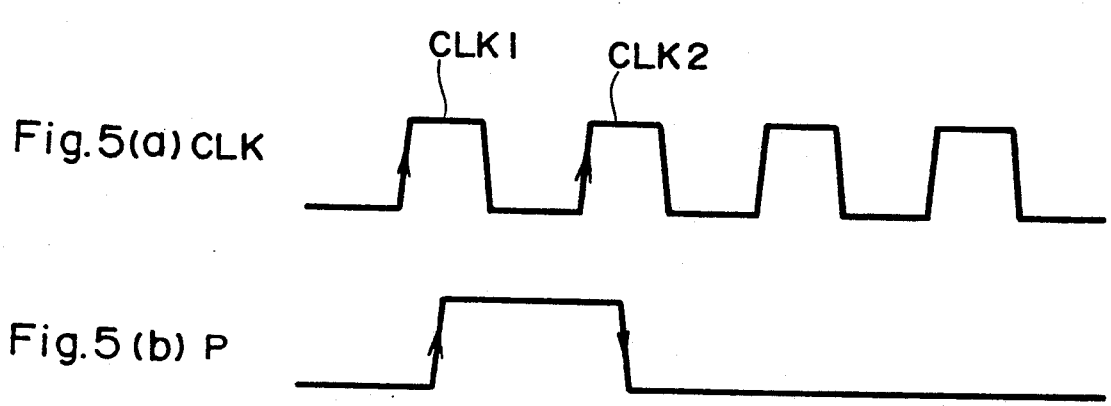

A timing relationship between the switching pulse P and the clock pulse CLK is shown in FIG. 5. The switching pulse P shown in FIG. 5(b) rises a certain time after the rise of the clock CLK1 of the clock pulse CLK shown in FIG. 5(a), and falls a certain time after the fall of the next clock CLK2. Accordingly, a new control signal S is produced from the D-type flip-flop 43 to which the clock pulse CLK is applied, at the timing of the rise of the clock signal CLK2, in accordance with the cell information currently inputted.

The reset signals RA and RB are produced by the AND circuits 35 and 38, supplied to the D-type flip-flops 52 and 54, and supplied to the NAND circuits 53 and 55 in synchronism with the input timing of the switching pulse P. In the NAND circuits 53 and 55 the reset signals are ANDed with the switching pulse P and the output signals are inverted and then supplied to the AND circuits 51 and 56 in the shift registers 23 and 24. In the AND circuits 51 and 56, the output signals of the NAND circuits 53 and 55 are ANDed with the output signals of the D-type flip flops 29 and 33, and the resulting signals are supplied to the data input terminals D of the D-type flip-flops 30 and 34. As a result, the reset signals RA and RB are set to "1", which are then inverted to "0", which in turn are supplied to the AND circuits 51 and 56. Thus, the vacancy identification bit I of the cell which lost in the conflict is reset.

The switching element 26 comprises a NOT circuit 44, NOR circuits 45 to 48 and NOR circuits 49 and 50. The connection state thereof is switched as shown in Table 2 in accordance with the control signal S supplied from the controller 25.

TABLE 2

| Signals S | Switching State |
|---|---|
| 0 | Cross |
| 1 | Go straight |

When the control signal S is "0", the cell data A and B supplied from the input terminals 18a and 18b and outputted from the shift registers 23 and 24 are supplied to the output terminals 18d and 18c, respectively. In this case, the lines connecting the input terminals 18a and 18b with the output terminals 18d and 18c cross so that the travel directions of the cell data A and B cross. When the control signal S is "1", the cell data A and B are supplied to the output terminals 18c and 18d, respectively. Thus, the lines connecting the input terminals with the output terminals are parallel and the travel directions of the cell data A and B are straight.

Such connection state is attained by the following operation of the switching element 26. When the control signal S is "0", the inverted signal of the control signal S supplied from the NOT circuit 44 is "1" so that one input of each of the NOR circuits 45 and 48 is always high level. Accordingly, the outputs of the NOR circuits 45 and 48 are always low level without regard to other inputs.

Further, since the control signal S is "0", one input of each of the NOR circuits 46 and 47 is always at the low level and the outputs of the NOR circuit 46 and 47 are determined in accordance with other inputs. The output of the NOR circuit 47 is the inverted signal of the data supplied to the input terminal 18a, and the output of the NOR circuit 48 is the inverted signal of the data supplied to the input terminal 18b. The output of the NOR circuit 47 is further supplied to the NOR circuit 50, and the input data from the input terminal 18a is again inverted into the original signal, which is supplied to the output terminal 18d. The output of the NOR circuit 46 is further supplied to the NOR circuit 49 where it is again inverted into the original signal, which is supplied to the output terminal 18c.

As a result, when the control signal S is "0", the travel directions of the input cells A and B cross.

When the control signal S is "1", one input of each of the NOR circuits 46 and 47 is always high level as opposed to the above case. As a result, the outputs of the NOR circuits 46 and 47 are always at the low level. On the other hand, one input of each of the NOR circuits 45 and 48 is always low, and the outputs of the NOR circuits 45 and 48 are determined in accordance with other inputs. The output of the NOR circuit 45 is the inverted signal of the data supplied to the input terminal 18a, and the output of the NOR circuit 48 is the inverted signal of the data supplied to the input terminal 18b. The output of the NOR circuit 45 is supplied to the NOR circuit 49, and the input data from the input terminal 18a is again inverted into the original signal, which is supplied to the output terminal 18c. The output of the NOR circuit 48 is supplied to the NOR circuit 50 where it is again inverted into the original signal, which is supplied to the output terminal 18d.

As a result, when the control signal S is "1", the travel directions of the input cells A and B are straight.

The cells supplied to the input channels 1 to 8 of the 8×8 exchange switch 17 are read starting from the vacancy identification bits I of the headers H which are located at the tops of the cells. When the headers H are to be read into the input channels 1 to 8, the cell synchronization signal C is supplied to the switching pulse generator 19, which generates the switching pulses p1 to p3, at the timing at which the connection of the blocks 20 to 22 are to be switched. The header H is read into the first stage block 20 of the 8×8 exchange switch 17 by the switching pulses p1 to p3, and it is outputted from the final stage block 22.

The vacancy identification bit I and the corresponding bit of the destination address AD are supplied to the controller 25 of each of the 2×2 unit switches 18. The controller 25 performs the predetermined logical operation in accordance with Table 1 based on the input bit information and supplies the resulting control signal S to the switching element 26 when the switching pulses p1 to p3 are generated. Switching element 26 determines its own connection state in accordance with Table 2.

When at least one of the vacancy identification bits I of the two cells supplied to the 2×2 unit switch 18 is "0", at least one of the bits $A_o$ and $B_o$ at the timing at which the switching pulse P is produced is "0". Thus, as seen from the logical expressions of Table 1, the control signal S follows the bit $A_n$ or $B_n$ of the destination address AD of the cell whose vacancy identification bit I (bit $A_o$ or $B_o$) is not "0". Accordingly, the connection state of the switching element 26 is set to a state in which the cell whose vacancy identification bit I is not "0" is preferentially outputted.

In this case, one of the bits $A_o$ and $B_o$ is always "0" as described above, both reset signals RA and RB are "0" as seen from the logical expression of Table 1. Thus, the output signals to the AND circuits 51 and 56 in the shift registers 23 and 24 are "1", and the input data of the D-type flip-flops 30 and 34 follow the output data of the D-type flip-flops 29 and 33, because there is no conflict of cells as the control signal S is generated when one of the vacancy identification bits I is "0" such that the destination address of the information of the "0" cell is neglected.

When both vacancy identification bits I of the 2-input cell are "1" and the bits $A_n$ and $B_n$ of the destination address AD are different from each other, that is, when effective information is retained in the 2-input cell and the corresponding bits of the address are different, the control signal S is determined by the combination of the bits $A_n$ and $B_n$ as seen from Table 1 to determine the connection state of the switching element 26.

In this case, both reset signals RA and RB are "0", because the bits $A_n$ and $B_n$ are different from each other because of different addresses, one of the bits $A_n$ and $B_n$ is always "0", and the AND function of the bits $A_n$ and $B_n$ and the AND function of the bits $\overline{A_n}$ and $\overline{B_n}$ shown in Table 1 are always "0".

On the other hand, when both vacancy identification bits I of the 2-input cell are "1" and the 2-input cell retains effective information, and the corresponding bits $A_n$ and $B_n$ of the destination address AD are same, the input cells conflict. Thus, the cells are processed in the following manner and the won cell is outputted to the output terminal in accordance with the destination address stored in the cell. The vacancy identification bit I of the lost cell is reset to "0", and the connection state of the switching element 26 is determined such that the cell is outputted to the different output terminal than the destination address.

When the bits $A_n$ and $B_n$ are "1", $A_o \cdot \overline{A_n}$ in the expression of the signal S in Table 1 is "0" and $B_o \cdot B_n$ is "1" so that the control signal S is "1". As a result, the connection state of the switching element 26 is determined to the direction which causes the cell data to go straight as shown in Table 2. In this case, since all bits in the expression of the reset signal RA shown in Table 1 are "1", the logical operation result for the rest signal RA is "1". When the reset signal RA is supplied to the AND circuit 51 in the shift register 23, it is changed to "0" and the input data to the D-type flip-flop 30 is forcibly changed to "0". Accordingly, vacancy identification bit I of the cell inputted from the input terminal 18a is forcibly changed to "0" and it is outputted to the output terminal 18c with the indication of the cell which has no effective information. Since $\overline{A_n} \cdot \overline{B_n}$ in the expression of the reset signal RB shown in Table 1 is "0", the reset signal RB is "0". As a result, when the reset signal RB is supplied to the AND circuit 56 in the shift register 24, it is "1" and the input data of the D-type flip-flop 34 is "1". Accordingly, the cell B supplied to the input terminal 18b has the vacancy identification bit I held "1" so that it is handled as effective information and preferentially supplied to the output terminal 18d.

When the bits $A_n$ and $B_n$ are "0", $A_o \cdot A_n$ in the expression of the signal S in Table 1 is "1" and $B_o \cdot B_n$ is "0". Thus, the control signal S is again "1". Accordingly, the connection state of the switching element 26 is determined in the direction to cause the cell data to go straight, as it does in the previous case. The reset signal RA resulting from the logical expression of Table 1 is "0", and the reset signal RB is "1". As a result, the vacancy identification bit I of the cell A supplied to the input terminal 18a is held "1" and the cell A is handled as effective information. The vacancy identification bit I of the cell B supplied to the input terminal 18b is forcibly reset to "0" and marked as invalid information.

In accordance with the present embodiment, even if the cells both having effective information and the same destination addresses are simultaneously applied to the 2×2 unit switch 18 so that the cells conflict, the lost cell has the vacancy identification bit I changed to "0" and marked as the cell having no effective information. As a result, even if the lost cell is sent to the direction different from the predetermined path, it is processed in the next stage unit cell as the cell having no effective information. Accordingly, a probability of loss of the cell having effective information is reduced and the transmission of wrong information is eliminated.

In the present embodiment, the present invention is applied to the 8×8 exchange switch 17. However, the present invention is not limited to such embodiment but it may be applied to a 16×16 switches to attain the same effect.

A second embodiment of the present invention is now explained with reference to FIGS. 6 to 8. The like elements are designated by the like numerals and duplicated explanation is omitted.

Figure 6:
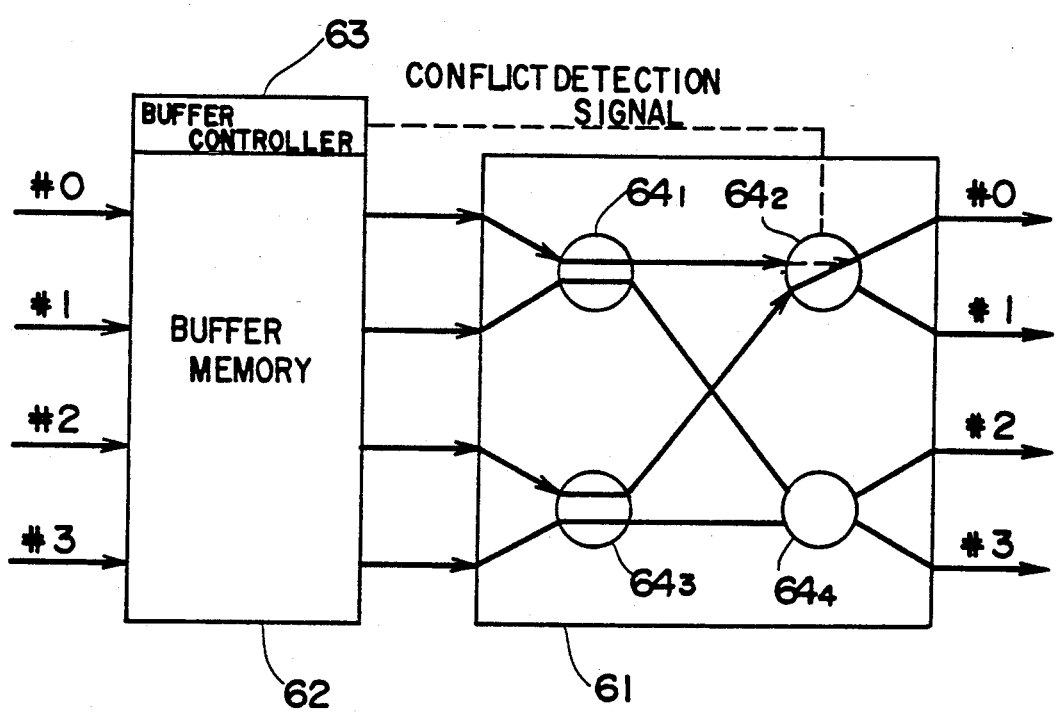
FIG. 6 shows a configuration of a broad band digital exchange in accordance with a second embodiment of the present invention.
Figure 7:
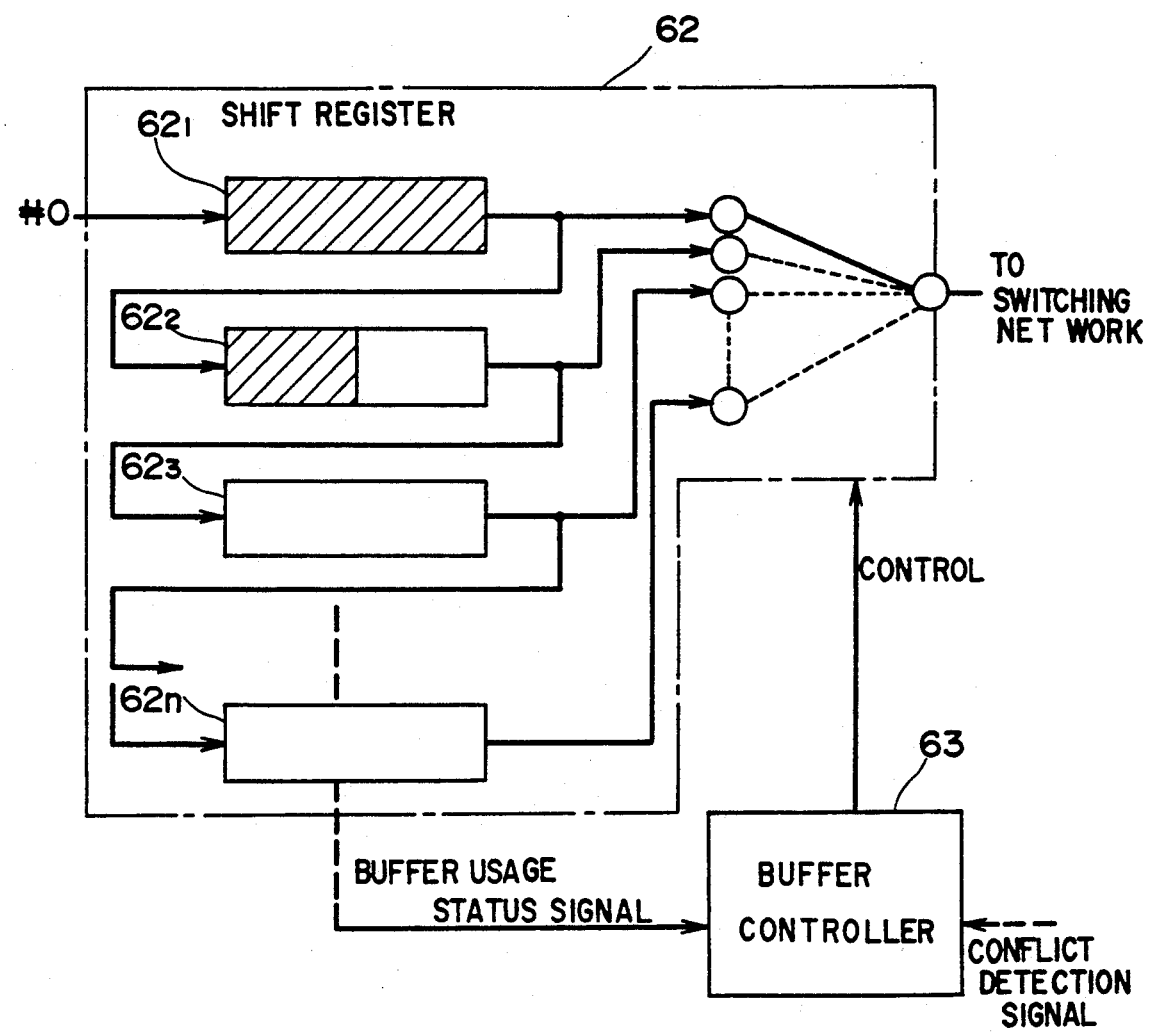
FIG. 7 shows a block diagram of a buffer memory shown in FIG. 6.

FIG. 6 shows a broad band digital exchange in accordance with the second embodiment. A buffer memory 62 stores cells received by input channels #0 to #3. A buffer control unit 63 controls sending of the cells stored in the buffer memory 62 based on conflict detection signals supplied from switching elements $64_1$ to $64_4$ in the switching element network 61. In FIG. 6, only the conflict in the switching element $64_2$ is shown. The switching element network 61 switches the transmission path in accordance with the destination addresses stored in the input cells to output the input cells to the predetermined output channels #0 to #3.

A data format of the cell is similar to that in the first embodiment shown in FIG. 1. The coding into the data format is attained by a higher layer of the broad band digital exchange, based on the data which includes subscriber's addresses, sent from an adaptor provided between a terminal and the transmission path. The destination data of the header is expressed in binary notation, and the first bit represents the travel direction in the first switching element, the second bit represents the travel direction in the second switching element, and so on.

When the cells are applied to the input channels #0 to #3, the buffer control unit 63 stores the cells supplied to the buffer memory 62 in accordance with the clock pulse CLK extracted from the information on the transmission path. The buffer memory 62 comprises shift registers corresponding to the input channels #0 to #3, and detail thereof is shown in FIG. 7. Each of shift register $62_1$ to $62_n$ has a number of stages (capacity) to store data which is a multiple of the cell length, and data can be sent out from any output stage which is provided for each cell length. Data is supplied to each of the shift registers $62_1$ to $62_n$ in accordance with the clock pulse CLK so that the data is shifted.

Figure 8:
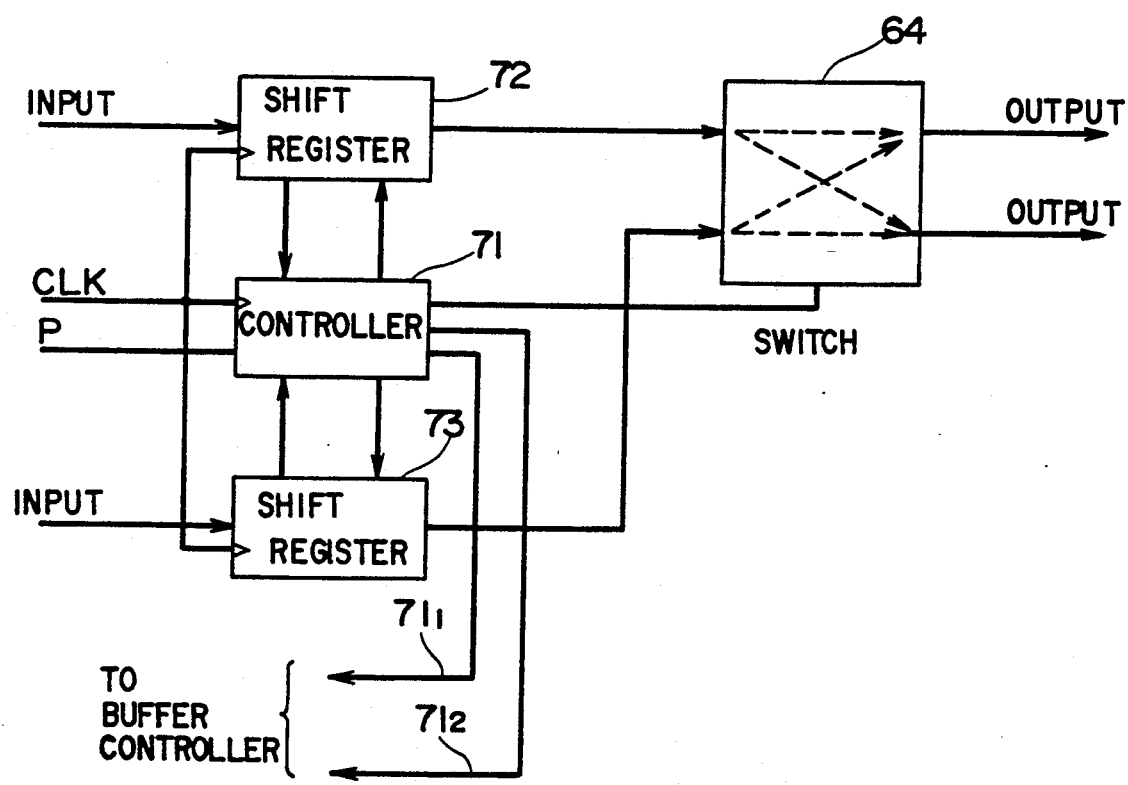
FIG. 8 shows a block diagram of a detection signal output unit shown in FIG. 6.

FIG. 8 shows a configuration of a detection signal output unit which produces a conflict detection signal. The detection signal output unit is arranged in a preceding stage to the switching element 64. The clock pulse CLK generated by the clock generator (not shown) is supplied to the controller 71, and the switching pulse P is also supplied at the timing of the send-out of the cell. The controller 71 detects the top bit of the cell supplied to the two input terminals, based on the clock pulse CLK and the switching pulse P. The address data used for the address switching in the switching element 64 is stored at a bit position which is a predetermined number behind the top bit. The controller 71 reads the address data from the shift register 72 and 73, and switches the connection state of the switching element 64 in accordance with the address data to pass the input information.

When the address data of the cells supplied to the two input terminals indicate the same output terminal of the switching element 64, the controller 71 controls such that the obliquely traveling cell can preferentially pass. It also sends out the conflict detection signal indicating that the non-preferential cell has been lost, to the buffer controller 63 through a signal line $71_1$ (or $71_2$). The preferential cell is sent out directly from the shift register 72 (or 73). The non-preferential cell is changed to null data which is identification data to indicate non-useful information when the data is shifted, and it is sent by the switching element 64 to an output terminal which is in a direction different from the address data.

In the first embodiment, when the cells both having effective information and the same destination addresses conflict, the straightly travelling cell is passed preferentially by the controller 25. However, as described above in the present embodiment, it is possible to pass the obliquely travelling cell preferentially by the same means as the first embodiment.

On the other hand, when the buffer controller 63 receives the conflict detection signal through the signal line 71, it resends the corresponding cell in the buffer memory 62 at the next cell sending timing and continues this operation until the conflict detection signal terminates. As the resending is repeated, the cells supplied to the input channels #0 to #3 may overflow in the buffer memory 62 and the cells may be discarded. However, in most cases, the discard rate of the cells is reduced by the resend operation of the cells. If the conflict detection signal is not received in a predetermined time after the cell has been sent out, a new cell is sent out at the next cell sending timing. The buffer controller 63 watches the usage status of the buffer memory 62, and fetches the information from the preceding stage shift register $62_i$ to the last stage at which the information (cell) is retained, and sends out the fetched information (see FIG. 7)

The second embodiment is not limited to the specific explanation but various modifications thereof may be made.

For example, the conflict detection signal need not be sent back through the two signal lines $71_1$ and $71_2$ so long as it is known that the information supplied to a specific input channel has been lost. Where high speed operation is required, the conflict detection signal may be serial data. The buffer memory 62 need not be a shift register but it may be an IC memory such as a RAM.

A third embodiment of the present invention is now explained with reference to FIGS. 9 to 11. The like elements are designated by the like numerals and duplicated explanation is omitted.

Figure 9:
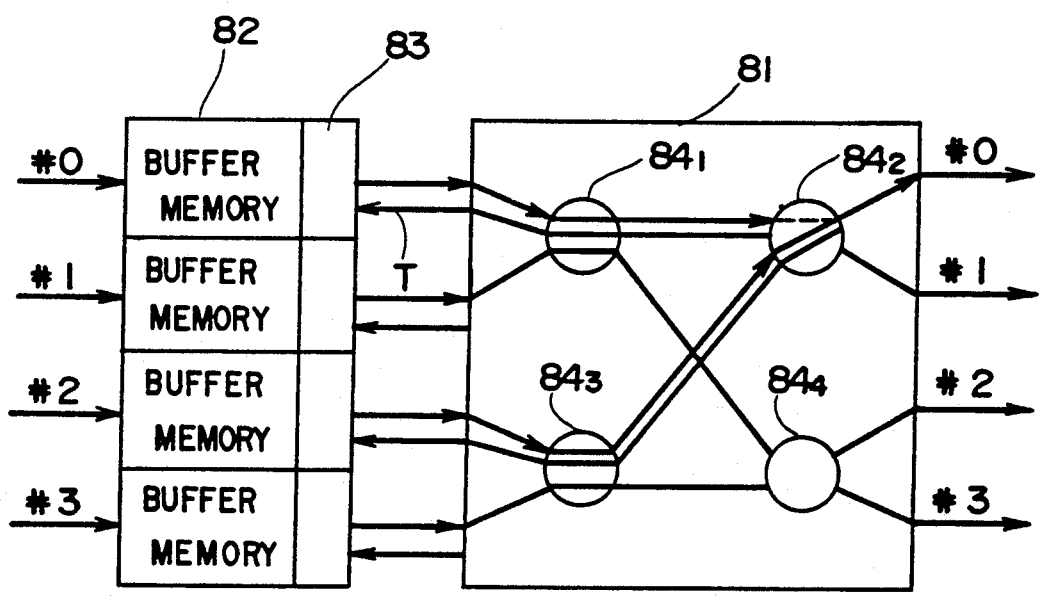
FIG. 9 shows a configuration of a broad band digital exchange in accordance with a third embodiment of the present invention.
Figure 10:
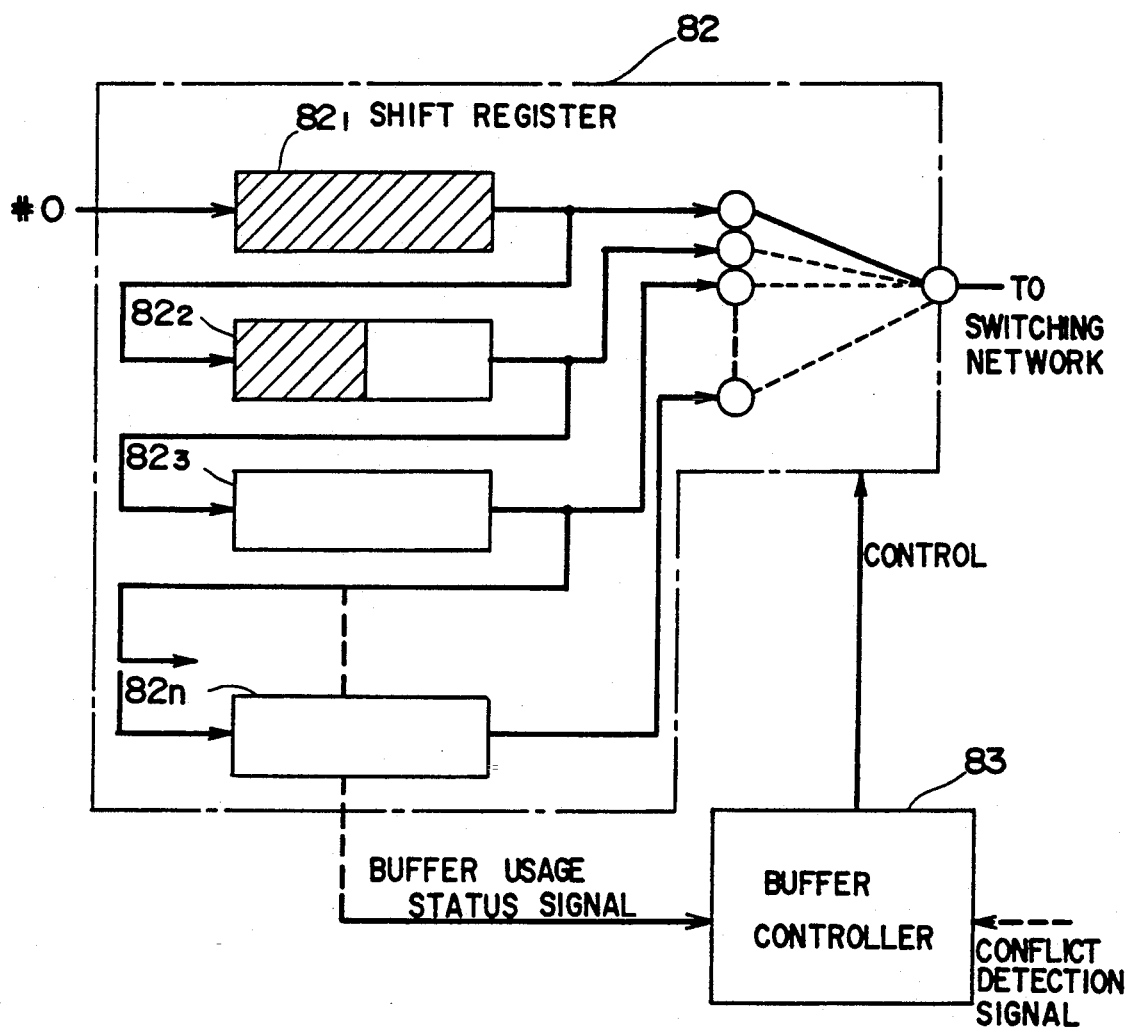
FIG. 10 shows a block diagram of a buffer memory shown in FIG. 9.

FIG. 9 shows a broad band digital exchange in accordance with the third embodiment. A buffer memory 82 and a buffer controller 83 are provided for each of input channels #0 to #3. The cell information supplied to the input channels #0 to #3 is stored in the buffer memories 82 under the control of the buffer controllers 83. The buffer controllers 83 control the send-out of the cells stored in the buffer memories 82 in accordance with the conflict detection signals supplied from the switching blocks $84_1$ to $84_4$ in the switching element network 81. In FIG. 9, only the conflict in the switching block $84_2$ is shown. The switching element network 81 switches the transmission path in accordance with the destination addresses stored in the input cells to output the cell to the predetermined output channel #0 to #3. The data format of the cell is same as those of the first and second embodiment shown in FIG. 1.

When the cell is supplied to the input channels #0 to #3, the buffer controller 83 stores the cell information into the buffer memory 82 in accordance with the clock pulse CLK. The buffer memory 82 comprises shift register corresponding to the input channels #0 to #3, and detail thereof is shown in FIG. 10. Each of the shift register $82_1$ to $82_n$ has a number of stages (capacity) to store a multiple of the cell length, and data can be sent out from any output stage provided for each cell length. Data is supplied to the shift registers $82_1$ to $82_n$ in accordance with the clock pulse CLK so that the data is shifted.

Figure 11:
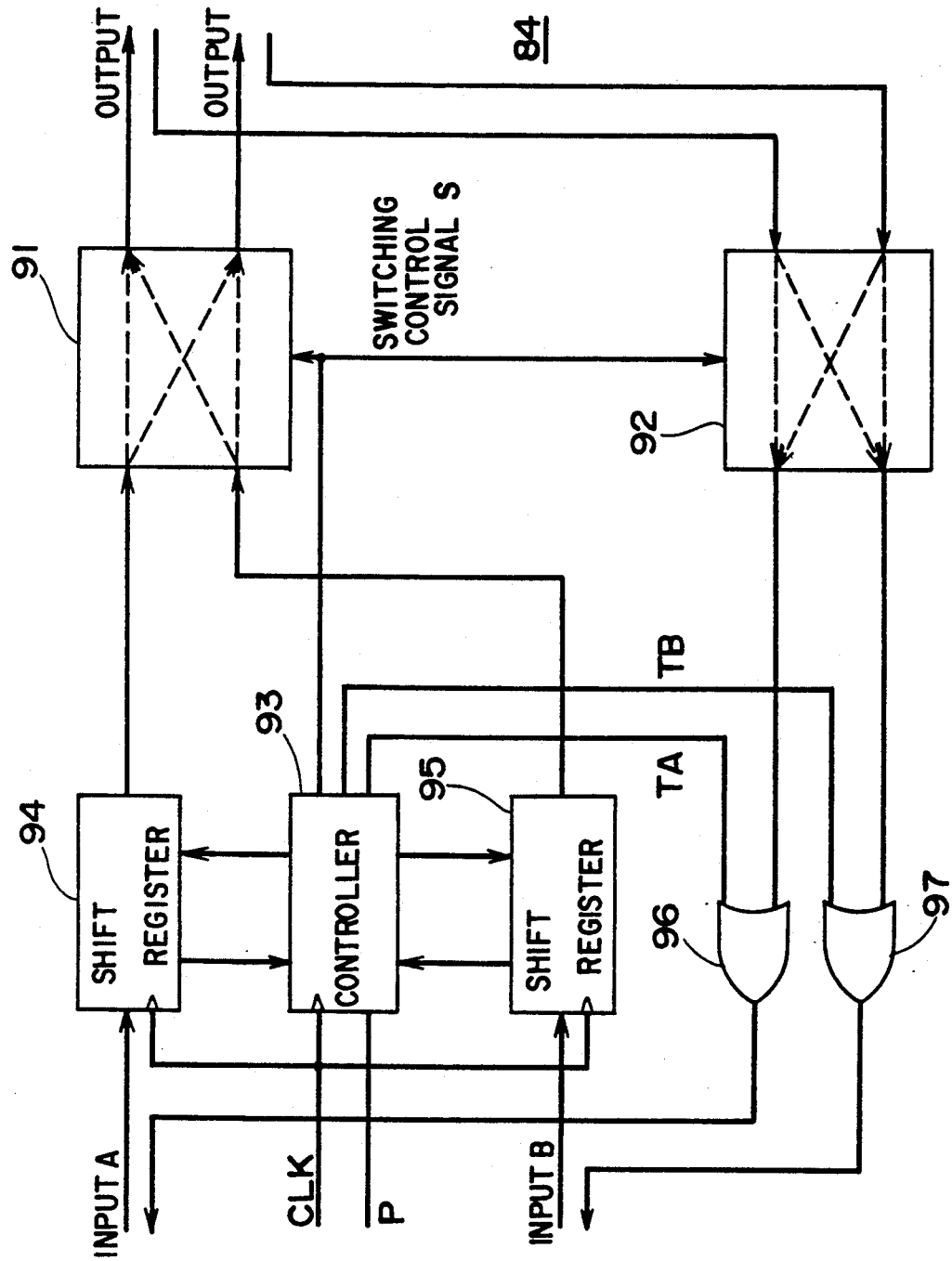
FIG. 11 shows a block diagram of a switching block shown in FIG. 9.

FIG. 11 shows a configuration of the switching block 84. A first switching element 91 controls the transmission path through which the cell information passes, and a second switching element 92 controls the transmission path of the conflict detection signal from downstream (as viewed from the flow of information). The switching of the switching elements 91 and 92 and the outputting of the conflict detect signal are effected by the controller 93. The shift registers 94 and 95 and the controller 93 constitute the detection signal output unit. OR circuits 96 and 97 OR the conflict detection signal supplied from the controller 93 with the conflict detection signal sent from the switching element 92.

The first and second switching elements 91 and 92 are mutually equally switched by the switching control signal S supplied from the controller 93. It is assumed that information reaches the switching block $84_i$ through several switching blocks 84 where the conflict of cells occurs. The second switching elements 92 of the switching blocks 84 through which the conflicting cell has passed before it reaches the switching block $84_i$ are appropriately switched by the switching control signal S so that a path for the conflict detection signal is established. As a result, the conflict detection signal can return to the input channel to which the conflicting cell was applied. The controller 93 detects the top bits of the cells supplied to the two input terminals in accordance with the switching pulse P and the clock pulse CLK. Further, the controller 93 reads the address data which is a predetermined number of bits behind the top bit, from the shift registers 94 and 95, and switches the switching elements 91 and 92 to send out the cell from the switching element 91.

When the address data of the input cells designate the same output terminal of the switching element 91, the controller 93 controls such that the obliquely traveling cell preferentially pass. The controller 93 also outputs a conflict detection signal which indicates that the non-preferential cell has been lost. The conflict detection signal includes two types of signals, TA and TB. When the input cell A has been lost, the conflict detection signal TA is outputted, and when the input cell B has been lost, the conflict detection signal TB is outputted. Thus, the conflict detection signal is returned to the channel to which the lost cell was supplied, and the conflict information is conveyed to the buffer controller 83. As a result, the preferential cell is sent out as it is from the shift register 94 (or 95). The non-preferential cell is changed to null data when the shift register 94 (or 95) is shifted, and it is sent to the output terminal different from the destination address in the switching element 91.

In the first embodiment, when the cells both having effective information and the same destination addresses conflict, the straightly travelling cell is passed preferentially by the controller 25. However, as described above in the present embodiment, it is possible to pass the obliquely travelling cell preferentially by the same means as the first embodiment.

In this manner, the conflict detection signal is returned to the buffer controller 83 through the path which is equal to the path through which the cell was sent out. When the buffer controller 83 receives the conflict detection signal, it sends out the corresponding cell stored in the buffer memory 82 at the next cell sending timing and continues this operation until the conflict detection signal terminates. As the resending is repeated, the cells supplied to the input channels #0 to #3 may overflow in the buffer memory 82 and the cells may be discarded. However, in most cases, the discard rate of the cells is lowered by the resending operation of the cells. If the conflict detection signal is not received within a predetermined time after the cell has been sent out, a new cell is sent out at the next cell sending timing. The buffer controller 83 watches the usage status of the buffer memory 82 and fetches the cell from the preceding stage shift register 82$_i$ to the last stage at which the cell is retrained and sends out the fetched cell (see FIG. 10).

The third embodiment is not limited to the above explanation but many modifications thereof may be made.

For example, the switching element network 81 is not limited to one which has four switching blocks 84 as shown in FIG. 9 but it may be different from system to system. The buffer memory 82 is not limited to the shift register but it may be an IC memory such as RAM.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. A broad band digital exchange, comprising:
a self-routing switch network comprising a multistage switching system including a plurality of switch means for selectively connecting a plurality of input channels and a plurality of output channels to send cell information, which has destination address data added thereto and which is applied to at least one of said input channels, to at least one of said output channels corresponding to said destination address data by switching said plurality of switch means in accordance with said destination address data, each of said switch means having detection means for discriminating whether any conflict exists among destinations of items of said cell information inputted into said switch means based on said destination address data thereof at the time of self-routing of cell information by said switch network; and
a buffer memory means connected to said switch network in a preceding stage thereof, for temporally storing said cell information applied to said input channels and for controlling send-out of information stored in said buffer memory means in accordance with a detection signal output from said detection means,
said cell information having in its header portion an identification bit for indicating whether information of said cell information is effective and destination address data following said identification bit,
said detection means including:
a pair of shift registers for respectively reading the cell information applied thereto bit by bit, and
a controller for reading-out from each of said shift registers bit information of the destination address data to provide a control signal for determining a transmission path through said switch network of each item of cell information, said bit information comprising a predetermined number of bits behind the top bits, and providing a conflict detection signal for indicating that non-preferential cell information has been lost,
each of said switch means further including a first unit switch, a second unit switch and a logical OR circuit, each of said first and second unit switches having a pair of input terminals and a pair of output terminals, each of said switch means reading out each item of cell information passed through each of said shift resisters and determining the switching state of said switch means on the basis of the control signal provided by said controller to switch the transmission path of each item of cell information, said second unit switch switching a transmission path of the conflict detection signal, and said logical OR circuit being operatively connected to said second unit switch and said controller and performing an alternation operation between the conflict detection signal issued from said second unit switch of the switch means and the conflict detection signal from the controller, to output an alternation result to an input of the second unit switch of the switch means.

2. A broad band digital exchange according to claim 1, wherein said buffer memory means re-sends non-preferential cell information temporally stored therein to said switch network on the basis of the conflict detection signal provided by said controller.

3. A broad band digital exchange according to claim 1, wherein each of said switch means is a 2×2 switch means and said controller returns back said conflict detection signal to a memory area of said buffer memory means in which non-preferential cell information is temporally stored, and said buffer memory means comprises means, responsive to said conflict detection signal, for rescinding the non-preferential cell information.

* * * * *